United States Patent
Kipp et al.

(10) Patent No.: US 12,169,893 B2
(45) Date of Patent: *Dec. 17, 2024

(54) LAYERED, OBJECT SPACE, PROGRAMMABLE AND ASYNCHRONOUS SURFACE PROPERTY GENERATION SYSTEM

(71) Applicant: Oxide Interactive, Inc., Timonium, MD (US)

(72) Inventors: Timothy James Kipp, Fallston, MD (US); Daniel Kurt Baker, Towson, MD (US)

(73) Assignee: Oxide Interactive, Inc., Timonium, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,354

(22) Filed: Apr. 27, 2023

(65) Prior Publication Data

US 2023/0334753 A1 Oct. 19, 2023

Related U.S. Application Data

(63) Continuation of application No. 17/306,663, filed on May 3, 2021, now Pat. No. 11,676,325, which is a continuation of application No. 16/294,765, filed on Mar. 6, 2019, now Pat. No. 10,997,774, which is a continuation-in-part of application No. PCT/US2018/048380, filed on Aug. 28, 2018.

(60) Provisional application No. 62/551,083, filed on Aug. 28, 2017.

(51) Int. Cl.
| | | |
|---|---|---|
| *G06T 1/20* | (2006.01) | |
| *G06T 15/00* | (2011.01) | |
| *G06T 15/04* | (2011.01) | |
| *G06T 15/20* | (2011.01) | |
| *G06T 15/50* | (2011.01) | |
| *G06T 15/80* | (2011.01) | |

(52) U.S. Cl.
CPC .............. *G06T 15/04* (2013.01); *G06T 1/20* (2013.01); *G06T 15/005* (2013.01); *G06T 15/20* (2013.01); *G06T 15/503* (2013.01); *G06T 15/80* (2013.01)

(58) Field of Classification Search
CPC ......... G05T 1/20; G05T 15/005; G05T 15/04; G05T 15/20; G05T 15/503; G05T 15/80
USPC .................................................. 345/530, 541
See application file for complete search history.

(56) References Cited

U.S. PATENT DOCUMENTS

| | | |
|---|---|---|
| 6,016,150 A | 1/2000 | Lengyel |
| 10,109,039 B1 | 10/2018 | Ray |
| 2004/0032409 A1 | 2/2004 | Girard |
| 2005/0140694 A1 | 6/2005 | Subramanian |
| 2015/0262413 A1 | 9/2015 | Baker |

(Continued)

OTHER PUBLICATIONS

International Search Report and Written Opinion in International Application No. PCT/US2018/048380, mailed Nov. 9, 2018 (7 pages).

*Primary Examiner* — Jacinta M Crawford
(74) *Attorney, Agent, or Firm* — Ice Miller LLP; Justin D. Swindells

(57) ABSTRACT

A method of generating an intermediate layer comprises generating local surface properties for a graphics object from parameter image maps, generating a first object image surface layer based on the local surface properties, storing intermediate surface results as an object image layer from the object local surface properties, and rendering a second object image surface layer based on the stored intermediate surface results.

7 Claims, 10 Drawing Sheets

(56) References Cited

U.S. PATENT DOCUMENTS

2016/0042491 A1 2/2016 Croxford
2017/0151496 A1 6/2017 Heinz, II
2019/0066365 A1 2/2019 Schmalstieg

LAYERED, OBJECT SPACE, PROGRAMMABLE AND ASYNCHRONOUS SURFACE PROPERTY GENERATION SYSTEM

CROSS-REFERENCE TO RELATED APPLICATIONS

This application is continuation of U.S. Nonprovisional patent application Ser. No. 17/306,663, filed May 3, 2021, now allowed, which is continuation of U.S. Nonprovisional patent application Ser. No. 16/294,765, filed Mar. 6, 2019, now U.S. Pat. No. 10,997,774, which is a continuation-in-part of International Application No. PCT/US2018/048380, filed Aug. 28, 2018, which claims priority to and the benefit of U.S. Provisional Patent Application No. 62/551,083, filed Aug. 28, 2017, each of which is hereby incorporated by reference herein in its entirety.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyrights whatsoever.

TECHNICAL FIELD

The present invention relates generally to the efficient generation of surface properties for use within a 3-Dimensional rendering system.

BACKGROUND

The eventual goal of a 3D object represented in a computer for graphics is the generation of a final 2D view space image, or in the case of real-time rendering, a sequence of 2D image frames, which is typically connected to an electronic video display device. In the case of VR, two images are computed with different view matrices and projections, achieving the stereoscopy required for VR.

This process of converting a 3D object into a view space image is referred to as rendering. The rendering of 3D objects into a view space image is a cornerstone of computer graphics and game engines. 3D Objects are built from a collection of surfaces, the properties of which are used to determine the color value of the rendered image in either a direct or indirect way. A surface may consist of primitives as simple as a triangle, or may consist of something complex like a subdivision surface. The rendering process usually involves the transformation of the 3D elements making up the 3D object's geometry. Techniques for rendering include triangle rasterization, point splatting, or ray tracing.

At some point during the rendering process, a color value for every visible location must be determined from the 3D object. Since a 3D object is a collection of surfaces, this color value is determined from one or more surface properties at a given projected points location along the surface. At each of these points on the surface, there exist a number of evaluated properties for a given scene and light environment. These properties may be as simple as a resultant color, but may also include things like positional surface displacement, normal, albedo, specular power and other properties needed to evaluate the resultant image color. While a simple implementation of a surface property might define the property to be the color itself, more complex properties might be stored and used at the generation of the final view space image. For example, one surface property might be thermal energy, in which case the final image may in fact be a conversion from IR energy into a corresponding color. In some cases, the physical properties can impact the physical location of the 3D object, as is the case with a displacement. All graphics and game engines work by rendering 3D objects by calculating the appropriate surface properties at each point that is needed for rendering, eventually collapsing these surface properties into a final color.

The process of evaluating these properties is sometimes referred to as a material, especially when referring to the final color of the 3D image. This evaluation process is usually heavily customized and programmed to achieve a specific artistic look. Most engines generate surface properties, often reduced to a simple color, via a shader program such as a vertex shader or a pixel shader. The shader program is generally constrained to a view space image in a forward renderer, or as a series of view space image shader programs in a deferred renderer.

Both forward and deferred renderers have certain limitations such as no access to object local surface properties due to their dependence on the view space image. They have limited ability to discover any given surface property on a region immediately adjacent or near a given area. These might be needed to calculate a realistic normal from a displacement map, or neighborhood shading data which could be used to create a subsurface scattering effect. In addition, these engines' systems have limited or no ability to reuse or cache intermediate surface properties, such as shaded values.

In decoupled shading, the final color values are calculated before and independently of the composition of the scene. However, this approach does not allow the re-use and full distribution of the intermediate shading values to solve some of the aforementioned problems, nor does it in and of itself allow distribution of the shading calculations to be distributed across multiple computing devices with separate memory systems.

Thus, there is a need for a system by which intermediate surface results can be generated from object local surface properties, consumed by the graphics engine, and stored for future use or re-use. This system will enable a category of effects which are previously impossible, impractical, or inefficient with other types of systems due to the lack of object local surface properties, and the ability to reference and re-use previous results. These intermediate results can increase efficiency by being able to be preserved across frames, shared among multiple renderings of the same scene, progressively updated, and can be generated by multiple computing systems which may not share memory systems. This invention solves the problems of high latency cloud rendering by separating and decoupling the expensive parts of rendering a scene, e.g. the generation of the aforementioned surface properties, with the relatively inexpensive part of the scene, the composition of the object into a view space image. By utilizing additional prediction, this system can eliminate or mitigate nearly all latency artifacts in a distributed rendering architecture, and can allow trade-offs for local computation vs remote computation based at an individual 3D object level. In addition, as generating surface properties can be a computationally expensive task, this system can increase efficiency by being able to preserve the results across multiple frames, share the results among multiple view space images, progressively update the surface properties in a sparse or dense fashion, and can also be generated by multiple systems detached from the system which is performing the rendering of a view space image.

SUMMARY

According to one example, a system for efficiently generating surface properties for use within a 3D computer visualization is disclosed. The system includes a surface definition that includes information specific to the surface and [1,N] surface layer definitions. These surface layer definitions include a multitude of information that is specific to the type of surface and the properties it desires to model. This information can be stored in program memory, local cache, or any N-Dimensional image format that is appropriate for the surface being modeled. In addition, there is a corresponding portion of program code which can be considered to be, but is not limited to a shader (Compute, Pixel, etc.), or any other program code which results in the generation of surface properties for a 3D rendering system.

This program code can be designed to execute on a plethora of different processors. The corresponding program code can be modeled by specific hardware in a processor which would be invoked instead of the program code. The system also includes a portion of memory within which to store intermediate surface results which can be used in the subsequent evaluation of other layers. This memory is assigned dynamically, and can be specific to the type of processor and memory system used in the evaluation of the program code for the surface layer. This memory can be re-used, shared or otherwise allocated to each surface layer depending on the requirements of the program code associated with that surface layer. The final surface layer is comprised of the intermediate results produced by each surface layer. In its most simplistic form the result can be, but is not limited to, an N-Dimensional color value representing a specific color space such as RGB (Red, Green, Blue), HSV (Hue, Saturation, Value), and others. Once the results are generated for the Final Surface Layers, those values are then able to be utilized in the generation of a View Space Image. These results can be compressed, transmitted from one processor or computer to another, and even re-used across multiple frames, multiple 3D objects, and multiple View Space Images.

BRIEF DESCRIPTION OF THE DRAWINGS

The foregoing and other advantages of the present disclosure will become apparent upon reading the following detailed description and upon reference to the drawings.

Figure 1:
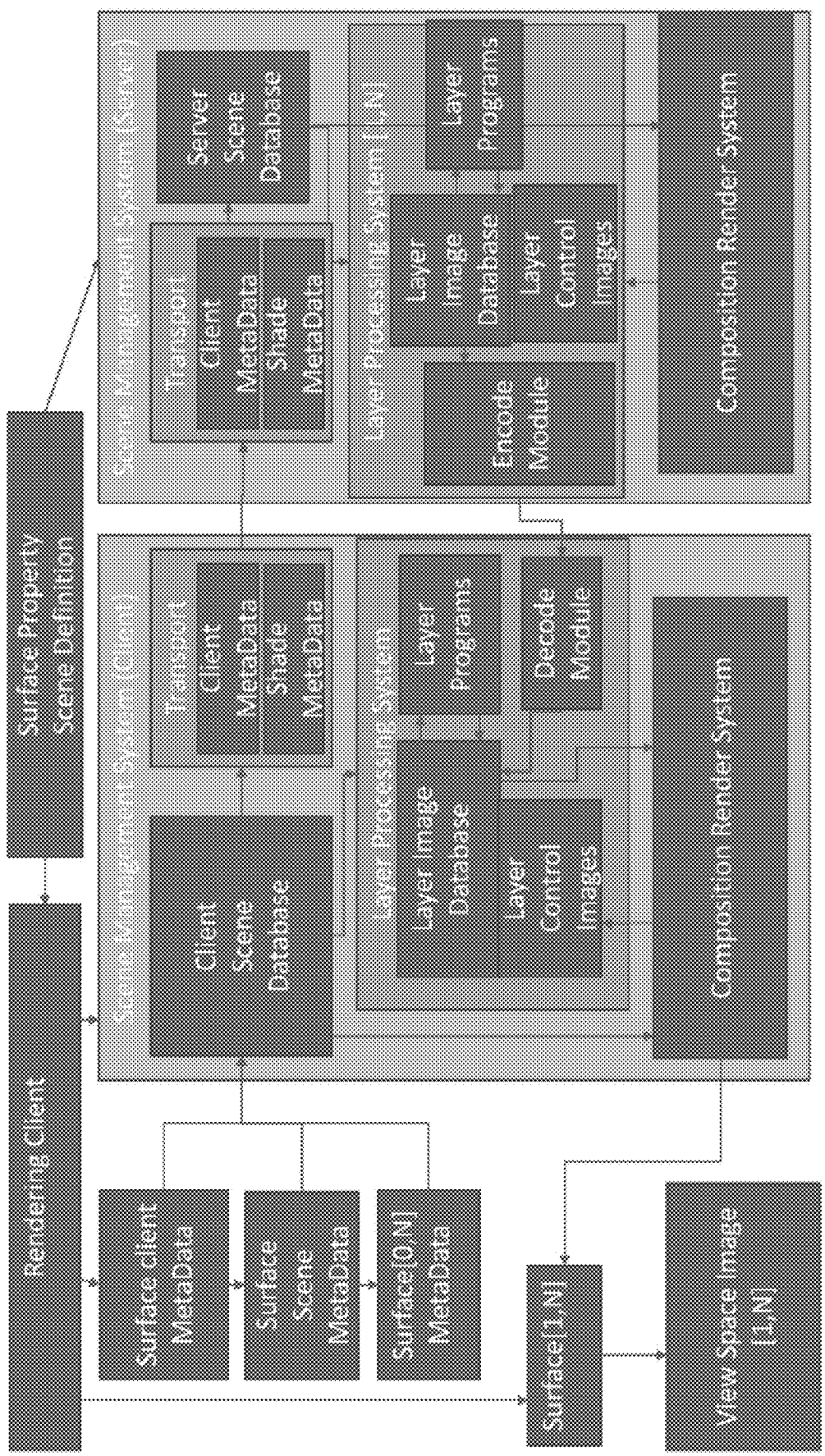
FIG. 1 shows an overview of an asynchronous surface property generation system, according to aspects of the present disclosure.

While the present disclosure is susceptible to various modifications and alternative forms, specific implementations and embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

The following definitions are used herein:

Object—a 3D or 2D mesh, consisting of a collection of 3D primitives, such as triangles, 3D vertices, normal etc. An object can also be a parametric primitive such as subdivision surfaces.

Surface—the 2D outside of an object, best described as a section of a 3D model flattened to a 2D manifold. Each point on the 3D model maps to a unique place in the 2D manifold and an inverse mapping is also defined, but may not be unique because extra samples may be needed for some types of operations. That is, multiple 2D points in the manifold may map to the same location on the 3D model.

Surface Definition—all intermediate layer images and layer programs which describe how to generate the surface properties as well as the Composite rendering program which consumes the layer images to build an image in the view space image.

Surface Properties—a collection of values which have mapping to an object's surface, which are needed for rendering an image. Examples include height map displacement, diffuse color, and transparency. Surface properties may be generated statically from the Object, or generated by combing runtime state during the execution of a layer program.

Surface Layer—an intermediate or final result of a material or sub-material pass which is generated during the generation of the surface properties.

Final Surface Layers—a final surface layer which is used in any rendering step.

Layer Program—a program which constitutes a pass in a surface definition, which may consume surface properties, which are either static and created at the creation of the object, or generated by one or more layer programs and stored in a layer image. A layer program may be implemented via a shading hardware system, and may perform shading operations, however it may do neither of these operations and as such is distinct from a shader Layer Image—an intermediate or final result of a layer program which is generated during the execution of a layer program. A layer image is the physical storage of non-static surface properties, and corresponds to a surface property of the model, either in final or intermediate form. A layer image is distinct and different from general 2D images and usually does not contain recognizable contents that would normally be associated with an image. Thus, a sprite or other similar construct would not be considered a Layer Image. In a typical use of a Layer Image, the Layer Image does not contain data which is standardly projected from 3D into 2D. Instead, it is an image only that it is stored in a locally continuous 2D data structure. It may include large holes, be unevenly sampled and contain hierarchical information equivalent or the same as a MIP map. Because the layer image is not an actual image, it cannot be turned into a view space image directly. It is used as input, combined with other input resources by the Composite Rendering Program to actually create a View Space Image.

Layer Image sample—an individual data element of a layer image which contains the actual properties, intermediate or final, of the surface definition. One a manifestation of a layer image sample would be a texel if the layer image is implemented as renderable texture on a GPU.

Layer Image Processing DAG—A directed acyclic graph of layer programs which specify the order of operations and dependencies of which a computing device needs to execute the layer programs Layer Image Database—A database containing layer images which are stored in a plurality of computing devices memory, indexed by at a minimum of a universally unique identifier (UUID) of an object or its' individual surfaces to be rendered.

Scene Management System—A system which manages relevant Objects in the scene and submits shading requests to the layer processing system, as well as composite rendering requests to the composite rendering system.

Layer processing System—A system which manages shading requests sent to it by a scene management system, which processes the layer programs on a plurality of computing devices such as a GPU, storing them with the Layer Image Database, and transmitting or receiving layer images from other layer image processing systems via an encode or decode module Composite Rendering System—A system which manages composite rendering requests from the scene management system and renders a view space representation of objects into one or more View Space Images.

Layer control image—a Layer Image with a value that determines which, if any, Layer Image Samples of a Layer Image were consumed by the composite rendering program Final layer control image—a union of the layer control images Precal—a program and data which can operate on any layer image but is defined outside the surface definition A precal is typically used to perform modifications to a 3D model, such as burn marks on wood which occur dynamically.

Composite Rendering Program—a program which consumes the Layer Images which contain Surface Properties and renders a view space representation of an Object into a plurality of View Space Images View Space Image—a 2D image defined by a virtual or physical camera, wherein the bounds of the image directly relate to the orientation, and projection methods of the camera Object Space—a 2D mapping and coordinate system which exists on the surface of an object. It represents a distinct and different coordinate system from a View Space Image and unlike a View Space image can be made to be invariant across time, or in cases where it is not invariant, exactly mappable from previous coordinate mappings.

Engine—a large software program which processes input from a user and displays results on a display. An engine may include components which run on different physical computers, such as a server and a client.

Temporal Compensation—the act of compensating for latency between the creation of a layer image and its' consumption, either by another layer program or a composite rendering program. Temporal compensation is differentiated from general prediction in that it may represent a range of possible motions rather than a specific point in time. That is, temporal compensation is plurality of possible points in the future that can be considered as a whole to create the best possible approximation of the layer images for the point of time at which they will be used in a View Space Image. Thus, temporal compensation is a superset of prediction.

Temporal Compensation Database—a database containing data to be used by layer programs, decal programs, and composite rendering programs to apply temporal compensation.

Several main paradigms exist for the generation of surface properties which are then used to render a final view space image. In many cases, the surface properties exist only temporarily in the rendering architecture. In a forward renderer, the surface properties are generated via a pixel shader in an on-demand system. However, the samples generated by these shaders do not have access to any intermediate layers that might exist, nor do they complete access to neighborhood surface properties, or other samples from shaders, in a continuous R2 space. Nor can these values generated be easily reused for a different view or subsequent frame.

In a deferred renderer, the generation of surface properties is either completely or partially deferred. A pixel shader (or fragment shader) instead of evaluating final surface properties such as color, saves properties into view space image buffers like a g-buffer. These intermediate buffers are then processed into final surface parameters, typically a color for a rendered image, via a GPU program which runs across the entire display screen. Because deferred rendering occurs across the entire frame, it is difficult or impossible to operate different execution paths on the intermediate results for each object, requiring them to be rendered in the same manner.

This disclosure, by contrast, performs surface parameter evaluation, which would include any shading. This evaluation and generation is independent of any view and occurs before any process of rendering the 3D object to the view space image. In addition, the surface properties of each object can be stored for an arbitrary amount of time, and the surface properties of each object remain intact and local to that object to whatever extent is required. In a deferred renderer, even if previous g-buffers are stored, it is at once a complex process to find the surface properties for a given object, nor is there any means to store or find a surface property of any part of the object which might have been partially occluded during the rendering step.

An object image layer is a piece of memory on a computing device which stores intermediate surface properties in a form that is continuous in R2, an example would be a regular grid, such that it is similar to that of an image at a local area. This object image layer is distinct from image layers of normal images in that interpreted by itself without the mapping of a 3D object, the image layer is incapable of being interpreted as an image for display. This object image layer instead serves as a storage vehicle for other stages of the rendering process.

Although this disclosure uses object image layers, it is contemplated to use other means of so long as neighborhood information for surface properties can be maintained, since neighborhood information is needed for rendering of the final image.

There are two types of object image layers used by this system. The first type is an intermediate object image layer, which as the name suggest, stores intermediate values which are used by the programmable part of the surface evaluation to achieve a certain material or artistic look. The second type is the final object image layer, which can also correspond to one of the intermediate object layers. These layers are storage places for operations which need to be accessed by other layers.

Each 3D Object stores its surface parameters via a final object image layer, and this system preserves the surface parameters in a memory which is close to the device which will eventually render with it. For a GPU rendering, it would store it on GPU memory. If the computation of surface properties occurs on multiple physical devices, then there will exist multiple copies of the surface parameters on different devices which will need to be synchronized. Each object's surface parameters and necessary information are stored in a database referenced by an identifier code which is provided when an object is specified to have its surface parameters evaluated. This same identifier code is used when specifying the rendering of the object with the surface parameters that have already been generated for a view space image.

Referring now to FIG. 1, a surface definition program is defined in language surface definition program. This program is compiled into a collection of layer programs, composite rendering programs, meta data providing information of how to bind resources and data to the programs, and information about how to process and provide for the layers such as the Image Layer DAG. This program can be compiled during the compilation of the software which is performing the rendering but could be compiled and loaded dynamically.

Parametrized Objects are created which contain the static data which will be consumed by the layer programs and the composite rendering program. The collection of all meta data and parametrized objects is called the surface property scene definition. In some cases, the server and client may not have the same data. This data is often in form of various surface properties which can be deduced or are provided by an Object but are invariant.

Next, an engine, such as would be used by a video game, will calculate and submit scene metadata, and provide information relevant to the temporal compensation of this scene at some point in the future. For example, a host compute program may have detailed information about the path of the camera, in which as it will provide the camera's current position, and a few future positions or ranges of positions.

This information is processed by a scene management system, which includes components as a model view controller, terrain, and so forth. This scene management system manages the scene and creates a temporally compensated plurality of state of the scene at a range of time. This plurality of state is stored in the temporal compensation database, either directly or via a sequence of messages.

The engine may also broadcast, for each Object, layer image modifiers, called precals, which can modify the contents of any layer image via a precal program. The precal programs are arbitrary programs contained outside the scope of the surface property definition. The scene manager arbitrates and broadcasts any precals for each 3D object to the layer program processor.

Because the object layer images map to physical locations on the 3D object, precals allow the object layer image can be modified such that any modifications occur on the surface properties of the 3D object. This is the opposite of decals, since precals occur before any of the object image layers are processed. In this process, a physical location of the 3D model is located and then mapped onto one or more object image layers, and then data is rendered into the object layer image corresponding to the modifications desired for the surface properties.

Using this temporally compensated plurality of state, the scene management system calculates a weight on the number and priority of each 3D object and its' individual layers to be processed. The scene management system applies a series of rules and metrics to create a collection which includes objects which might not be visible, but which are likely to be visible shortly. This collection of objects with their various information about their layer images which need processing is submitted to the layer program system.

The layer program system processes the per object instance meta data sent to it by one or more scene management systems, as well as any precal messages. The layer processor begins by binding the static surface properties, layer images, and per object instance meta data, by using additional meta data provided in the surface definition language, taking into account bindings whose data which is consumed by either the layer program, precal program, or composite rendering program may need to be temporally compensated. This submission is in the form of messages which can be redirected across a network in some configurations. During this process, relevant process times are recorded which can be applied in the aforementioned step for temporal compensation.

During this submission, in addition to the layer images that need processing, any all data which is required for the generation of the layer images is also sent by the scene management system. The layer image processing system considers, in their entirety, all of the layer programs and resultant updated layer images which require processing and acquires and manages memory needed by Layer Images. Layer programs are then executed on a computing device such as a GPU, with each layer program producing one or more layer images, which are potentially stored in the computing devices memory, but in the case of intermediate layer images, may be stored a form local to the computing device that is not backed by external memory, such as shared local memory as used by a compute shader.

The layer programs are executed with temporal frequency which is indicated by meta data on the surface property definition. Some layer programs may update when the host system, such as gameplay, marks the layer image as dirty. Layer programs may also read and write to the same layer images such that the layer program becomes an intermediate step. The precal programs are processed after their appropriate layer program or a clearing of a layer image, based on meta data specified in each layer program which determines which types of precals it depends on. In this manner, a precal can both read and write from any image layer. The program is defined outside the surface definition and the precals may execute on specific subsections of the layer image.

The layer programs are always executed in sequence defined Layer Program DAG such that all of the data from a dependent layer is known to be completed before the next layer is executed. The layer processing system will perform on computing device any necessary decompression or cache invalidation commands required to make a layer image data coherent to subsequent layer programs. This allows adjacent data to be available, and operations which require it, such as a Gaussian blur, are possible.

If the layer processing system is running in a server/client mode, the layer processing system stores all variants of any client which may be connected to it and compares the results of its' output to the known version of the image layer on the client. This information is consumed by an encode module (FIG. 2) which encodes the image layers to a compressed stream of data, which is transmitted by the server layer processing system to the client layer processing system. Only layer images which are consumed by the client version of the layer processing system and or composite rendering system are transmitted. The client layer processing system then decodes the messages via a decode module (FIG. 3) and applies the changes to the Layer Images to its' Layer Image database.

In the final process, the composite rendering generates view space representations of the object which are used are used to generate view space images, via the execution of the composite rendering program.

The input of the system is a set of parameter image maps (such as position, displacement, tangent, etc.), the intermediate results are known as intermediate object image layers, and the object image layers which are used for rendering an image are final object image layers.

The program which executes on each layer is called a layer shader. Though the layer images are typically two-dimensional, intermediate of final color layers could be higher dimension so long as the appropriate coordinate mapping is provided. The coordinate may be non-spatial, for example, a third coordinate might represent the surface changing over a time period. Or, an object image layer may be a voxel representation.

The layers are defined in a material definition language which allows the user to fully customize the input, output, and layer shading operations required. The object image layer shaders can be executed in any order as long as the results are consistent with the shading order specified in the material definition. It is not required that each Object Image Layer be evaluated at the same sampling rate as the other Object Image Layers. Each Object Image Layer may specify a different sampling rate function to determine the sampling rate desired for each Object Image Layer. The sampling rate function may be as simple as a multiplication of the default sampling rate, which is typically an estimated view area function. It may also involve a different screen size projection or take into account other view space factors such as chromatic aberration on a VR display.

Because each object image layer shader can store its results, each layer shader has access to results of the other layer shaders for use as input. This allows for operations which would otherwise be unstable or impossible to be performed in a dynamic, performant, and stable fashion. For example, instead of a static normal map being stored with an object, it is now straightforward to calculate a normal dynamically by creating an intermediate G buffer and performing straightforward filtering operations on it. This is possible because the layer shaders use an object space which preserves local neighborhood information suitable for generating many different types of intermediate surface properties such as curvature maps, local ambient occlusion, and so forth. In addition to filtering, operations such as a wide Gaussian blur can be easily be applied to intermediate shade information without any special case handling.

In contrast, while G-Buffers have been used in deferred renders to dynamically create normal, the results are unstable and often unusable because the local neighborhood information needed for a stable filter cannot be present due to its dependence on view specific properties, and the g-buffer is highly susceptible to variations from frame to frame, causing a shimmering effect.

For example, a wide Gaussian blur can easily be represented as a layer shader, requiring no special cases which are common in other material systems. The final surface result value, which is often a color value, is then consumed by a scene rasterization step.

There may also exist surface properties which could be unique for different view space images, but be computed simultaneously for improved efficiency. Examples of this include rendering multiple view space images (one for each eye) for a VR system, or rendering multiple view space images for multiple users in the same 3D scene at the same time. Thus, each object image layer shader may write to multiple object image layers simultaneously.

A typical surface parameter program sequence which generates final surface properties representing humanoid skin is contemplated. This process starts with a height map, generates a normal map using this height layer, performs a lighting calculation, applies a blur, and finally results in two parameter maps—one that represents a shaded color, and the other which represents a displacement from the base mesh.

Surface Definition Language

```
ConstantSet MaterialConstants
{
    [Name = "Camera"][SubName = "View"]
    float4x4 ViewMatrix;
    [Name = "Time"][SubName="Seconds"]
    Float TimeInSeconds;
    [Name = "Environment"][SubName = "SunColor"]
    Float3 SunColor = { float3(1,.8,1) };
}
ResourceSet InputSurfaceProperties
{
    [Name = "ObjectInputs"][SubName = "DisplementMap"]
    Texture2D DisplacementMap;
    [Name = "Inputs"][SubName = "Layer"][Index = 0];
    Textuer2D ProcessedDisplacement;
    [Name = "Inputs"][SubName = "Layer"][Index = 1];
    Textuer2D ComputedNormal;
}
ResourceSet OutputLayerImages
{
    [Name = "Outputs"][SubName = "Layer"][Index = 0]
    RWTexture<float4> OutputDisplacement;
    [Name = "Outputs"][SubeName = "Layer"][Index = 1]
    RWTexture<float4> OutputNormal;
    [Name = "Outputs"]SubName = "FinalColor"]
    RWTexture<float4> FinalColor;
}
```

-continued

```
MaterialGroup SampleMaterial
{
   ObjectConstants = MaterialConstants;
   ObjectInputs = InputSurfaceProperties;
   LayerOutputs = OutputLayerImages;
   CompositeRenderingProgram =
   { PixelShader = ObjectCompositorPS;
   VertexShader = ObjectCompositorVS};
      Layers
      {
         ComputeDisplacement:
            Program = ComputeDisplacementComputeShader;
            Outputs = Layer0;
         ComputeNormalMap:
            Program = ComputeNormals;
            Inputs = Layer0;
            Outputs = Layer1;
         ComputeFinalColor:
            Program = ShadeMaterial;
            Inputs = Layer1, Layer0;
            Outputs = FinalColor;
      }
}
```

Surfaces are defined in a parsed language syntax. The language is defined in a text file which is parsed and translated into a series of programs and data which can be consumed by both the client and server rendering system. In this example, the surface definition is called a Material Group, which contains a series of resource bindings, constant bindings, layer programs, the composite rendering program, and meta data which inform the system in its' operation. The material data consist of comprehensive reflection data, which includes delated and run-time queryable information on every input and output parameter consumed by the layer programs and the composite rendering program.

The surface definition defines how to render a 3D object, but itself is not an actual object for rendering. The actual object will contain the various pieces of data which the surface definition needs to generate an image of an object. Much of this data is surface parameters which are considered invariant to the 3D object, such as albedo color, normal map, and specular power.

Surface Property Description Language

Surface properties of an object are defined in a custom language which specifies the number and nature of each intermediate and final object image layer, as well as the programs which will generate the layer and possibly consume other intermediate object image layers. The surface property evaluation program is also defined here, such that the process by which the final image is rendered from the object image layers is entirely customizable for each object if so desired.

```
Material Terrain
{
Layer TerrainMask: Shader=TerrainMask;
Output=Layer0;SampleRate=Half;
Layer Height: Shader=HeightCalc; Output=Layer1;
Layer Normal: Shader=BilateralNormalCalc;
Read0=Height;Output=Layer2;
Layer Grass: Shader=GrassShader; Read0=Normal;
Read1=TerrainMask;
Output=Layer3;
Layer BlurGrass: Shader=GuassianBlur;Read0=Grass;Output=Layer0;
FinalLayer = BlurGrass;
}
```

In this example, Terrain is composed of five layers. TerrainMask is calculated at only half sampling rate of the other layers, to save on memory and computation. The Height is calculated by the height Layer which is processed into a normal by the Normal Layer. These are then consumed by the GrassShader which consumes the TerrainMask and Normal layers. Finally, BlurGrass blurs the layer which is marked as the final image layer which will contain a color that is used by the rendering step.

The surface property description language may define a specialized program to perform the reading of the final object image layers and translate it into the final image. This evaluation program could combine multiple object image layers in arbitrary combinations to compute the final image, or do something little more than finding a color property in a final object image layer and outputting that to the final image.

This evaluation program could blend object image layers from previous frames to amortize or smooth out surface property evaluation changes which occur frame to frame, such as specular highlights changing based on view angle. This can facilitate surface property evaluation at a rate lower than the rate of rendering the final image. In other words, the object image layers may be reused across multiple frames.

Resources are collections of data such as textures or buffers existing on a GPU memory, but may be also be stored in other computing devices memory than the one which is executing a layer program or composite render program. Examples include 2D textures, Cube Textures, Texture arrays, writable buffer, unordered access views (UAV), index buffers, any data accelerated data structures needed for ray tracing, and can include any pieces of structured data which is consumed by the device which is execute either the layer program or the composite rendering program. The resources can also be the layers themselves, which are bound via meta data Constant data bindings are sub pieces of data which may be stored in a specific resource, but constant data is typically used to communicate data from the system submitting the rendering commands, often a CPU, to the device consuming the commands, often a GPU.

The layer programs are data wide, parallel programs which consume data from the resource bindings, constants data, and layer images, and output their results to one or more layer images. Each layer program declares which layer images to which they output their results, and which layers they can consume. Layer programs need not write or consume from any other layer program, and may even read and write to the same image layer.

Each layer program further has meta data associated with it declaring the frequency which it should be updated, which can be linked to specific game events or temporal frequency. A layer program may declare itself, for example, to update once every other frame. This allows expensive operations to not be recalculated if the system knows that there is no change occurring, or for some operations to be recalculated at a lower temporal frequency. In one instantiation of this, a normal map may be calculated from a displacement map, if the displacement map has not changed then the generated normal map (which would be stored in one of the layers), need not be reprocessed. Layer programs can also be fully enabled or disabled by the host system, such that for a particular object a layer may or may not be executed. Each layer program can update itself independently of other layer programs.

In addition to layer programs updating the entire layer at varying temporal frequency, a layer program can execute partially in a series of progressive iterations. This is called a progressive update. To perform a progressive update, the layer processing system tracks and maintains for every object and for every layer program, two pieces of vital data to the layer program, one being the current iteration count, and the other being the total number of iterations possible. The layer program can then use an arbitrary sample mask to decide which samples in the layer image to update or compute.

One manifestation of this in a layer program is checkerboard rendering pattern where alternating blocks of layer image samples are processed. This is similar to checkboard rendering techniques which occur in deferred renderers, however the technique is being applied in object space, decoupled space and applied on arbitrary surface properties for each surface definition rather than a single surface property such as would occur across entire frame as in a deferred renderer.

Layer programs and Layer Image contain arbitrary surface properties, stored in layer image samples as numerical data, in this system. That is, they do not contain specific surface properties such as position or color, but rather contain whatever data is defined by the author of the layer programs and composite rendering program. Typically, these are created by a technical artist for specific use cases, such as rendering human skin or making shiny metal. However, there exist a small number of surface properties the system recognizes such as the final shaded color. One example of using these layers would be to create a separate layer for each eye of a VR system, thereby allowing the shade calculations of a VR program to be computed simultaneously.

On example of the layer program manifestation is a compute shader in Direct3D or Vulkan. However, other forms of parallel computing programs can also perform the same function. For example, compiled SSE x86, Pixel shaders, Cuda, or OpenCL programs could perform equivalent functionality and some devices one of these forms of the layer program might be utilized.

The composite rendering program is a program which consumes some of the layer images and produces a view space image representation of an object. One implementation of this is a vertex, geometry and pixel shader grouping which take some of the resources on input and rasterize the mesh into an image buffer. Another implantation would be a hit shader and vertex skinning shader which would allow the generated layers to be added into a ray traced scene.

There are distinct advantages of allowing general execution in any of these types of programs. For example, if the layer programs are implemented via a compute shader, the program can access neighbor information without having to explicitly store the results into another layer, via the local shared memory property. This allows for increased efficiency since the intermediate values need not be stored in an intermediate object image layer.

Parameterized 3D Objects

A 3D object that is rendered into an image is a corner stone in computer graphics. It is often referred to as a Mesh or a Model. A Mesh or Model describes the geometry of the 3D object via a collection of parts, which are sometimes referred to as surfaces or primitives. Generally, a Mesh is used to refer to a 3D model with primitives that consist of triangles or polygons, while a model can have a higher level representation of 3D primitives such as NURBS or sub division surfaces.

For the purpose of this disclosure, the exact representation of 3D object does not matter so long as the 3D model has a parametrization, that is, some function which can take a point on the surface of the model and map it to some type of data storage location that is continuous in R2. That is, points near other points should also be other points in the data storage location, at least in terms of their ability to be discovered, not necessarily physically close in memory.

Usually, 3D Objects have a texture parameterization which provides a convenient method of mapping points on the surface of the 3D geometry into a texture map. This is referred to as a texture atlas. Any 3D object which has a texture atlas automatically meets the criteria needed for this disclosure.

Scene Management System

Figure 4:
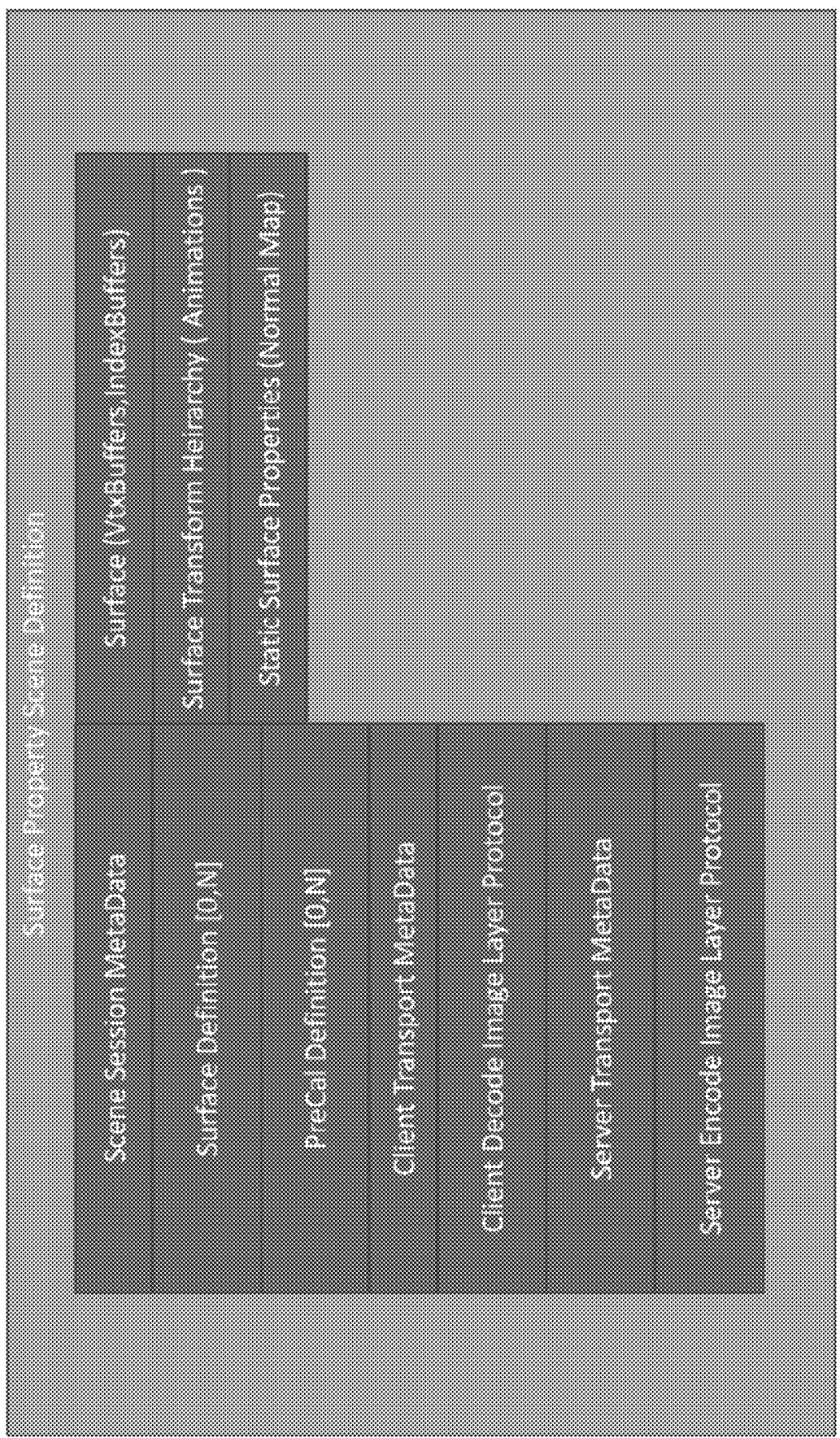
FIG. 4 shows data and metadata for an instance of an object's surfaces in a scene including both static and non-static data, according to aspects of the present disclosure.
Figure 5:
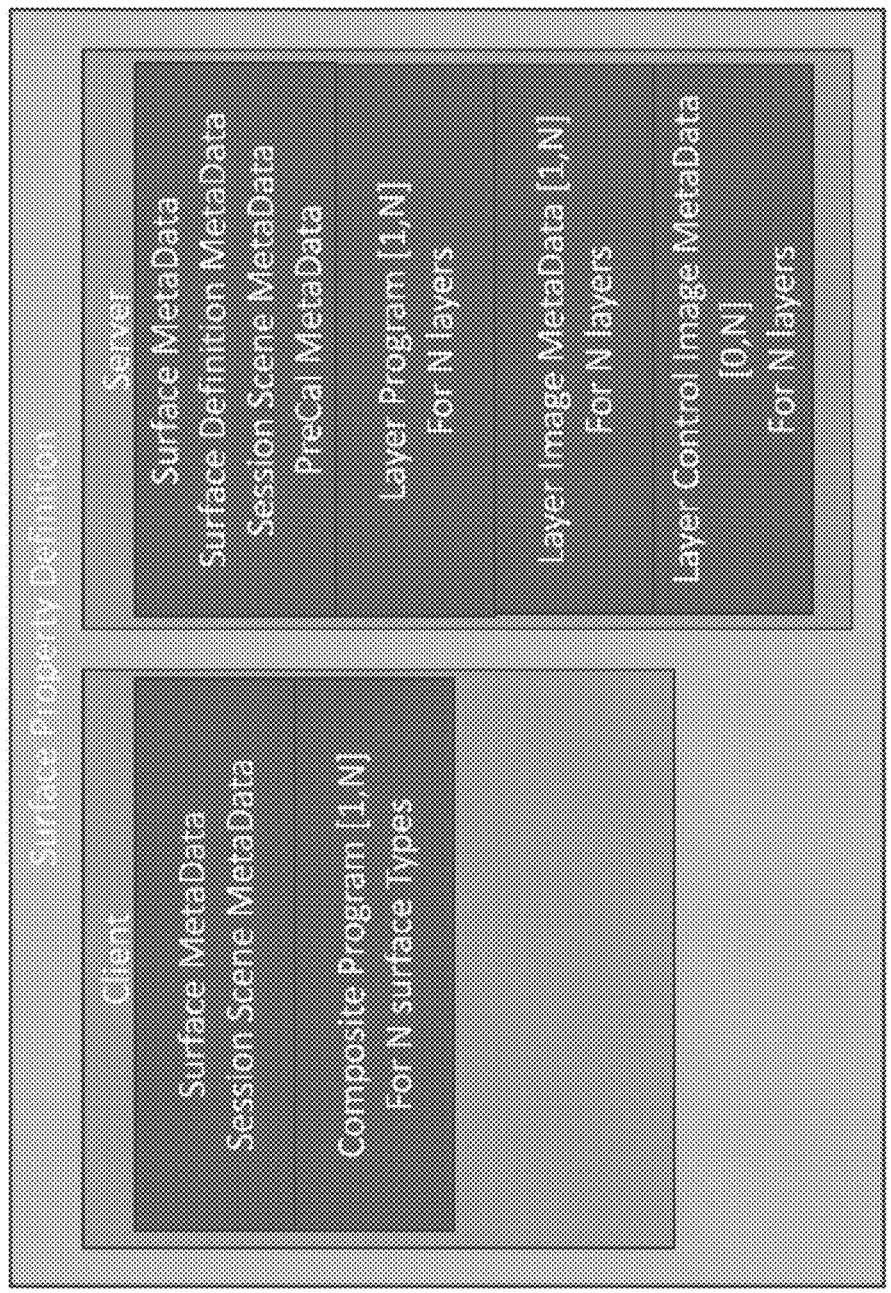
FIG. 5 shows additional data and additional metadata for an instance of an object's surfaces in a scene including both static and non-static data, according to aspects of the present disclosure.
Figure 6:
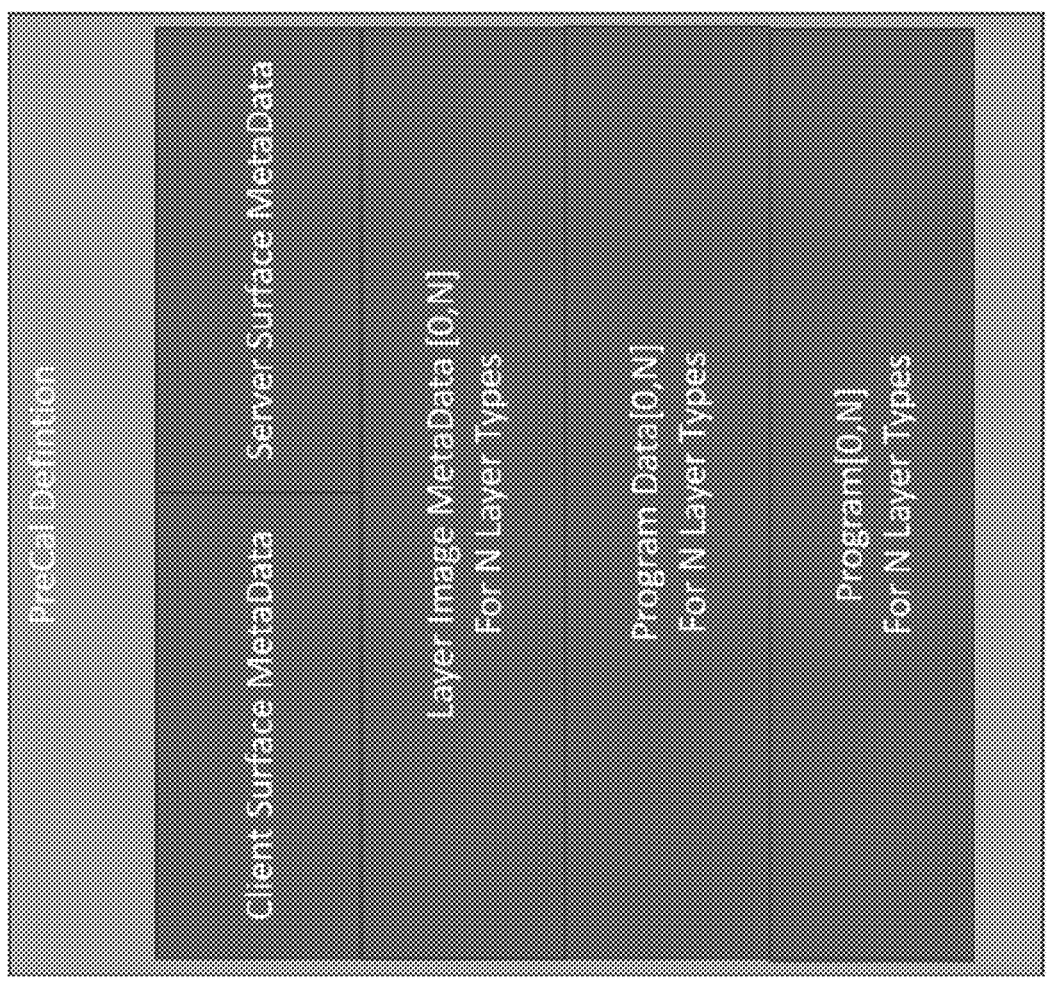
FIG. 6 shows data and metadata for a precal of an object's surface in a scene including both static and non-static data, according to aspects of the present disclosure.

The scene management system receives messages from an Engine and builds a scene database based on these messages, which contains the information needed for the creation of a view space image. The scene data base contains references to multiple surface property definitions (FIGS. 4 and 5), which contain the data needed for the rendering of objects. These surface property scene definitions will also be referenced by a layer program system and a composite rendering system. Theses scene property scene definitions contain more than just the surface property definitions (FIGS. 4 and 5), but also contain precals (FIG. 6).

A host system sends to the scene management system the state of the world via a sequence of messages, which indicate things like position, object type, animation state, and so forth. These messages may be processed locally, or could be replicated or transmitted across a network to a server version of the scene management system, which itself could be running in a cloud computing system, with multiple instances of the same scene running on separate computing devices.

A scene management system receives these messages and constructs a scene from them. Any object which is visible would be represented in some form in this scene management. The scene is not what is currently visible to a user of this system, but it is rather a super set of everything that is currently being considered as relevant to a view space image. In a game, this scene may extend substantially beyond what is currently known or possible to visible to the user.

In a typical scene, tens of thousands of objects may be tracked. A scene management system maintains full information about the current camera view. Unlike other systems, a scene management system also tracks information relevant to future state of every object. For example, it is fully aware of the animation state of each object and can predict for some amount of time in the future, typically less than 500 milliseconds, of where that object will be and what it will be doing.

Figure 8:
FIG. 8 shows data and modules contained inside a temporal compensation database, according to aspects of the present disclosure.

A scene management system does not directly render the object at its' current time, but instead uses an estimated latency time to construct a temporal compensation database (FIG. 8) based on a collection of timings maintained throughout the system relating to latency of varies parts of the overarching application (from the client to the server portion). That is, it may calculate that there is a total gap of 100 milliseconds between the engine which generated the scene commands and the time at which all the composite rendering programs have completed their generation of their corresponding objects into the View Space Image. If a car was moving at 30 m/s, thus, it would update the temporal compensation database such that layer programs could, should they chose, project the car in the scene three meters ahead of its' current position, projected along the likely path as provided by the gameplay state. In some cases, the temporal compensation may provide a range of possible locations, in which case a layer program may respond appropriately, for example dulling a specular highlight of an object in motion.

In the aforementioned example of an object, in this case a car, is not actually rendered at the projected location, rather the layer programs are executing using the appropriate bindings for the object at this point in time. That is, data bindings are routed the correct places in the temporal compensation database such that any surface properties stored in the layer images will be compensated for the point of time in the future of which they will be consumed. It may be the case that different layer programs are using different time projections, such that a height map layer is using a projection 200 milliseconds in the future while a specular color layer is using data on 50 milliseconds in the future. This is entirely specified by meta data associated with the layer programs. By using image layers which have been temporally compensated inside a composite rendering program, this invention effectively mitigates nearly all perceived latency caused by the computation of the surface properties being computed with a latency that is far higher then what traditionally is understood to be perceptible by humans.

The composite rendering programs will not typically use data the temporal compensation database, instead they utilize on the current state of the object. The temporal compensation is necessary so that in situations where there exists a high amount of latency, such as a network transmission of the shading from one device to the next, that the composite rendering program, which is executed sometime after the layer programs, is consuming data which more accurately represents its true state, rather than a state in the past.

Once this temporal compensation database is constructed, the scene system considers all relevant objects combined with this database to understand and estimate the state of an object when the layer images generated will actually be consumed via a composite rendering system. The temporal compensation database, strictly speaking, is not a single state, but rather a distribution of states. The scene management system understands that it will send two types of requests, requests for layer image processing and requests to the composite rendering system, but as the systems may run in parallel the requests sent to the layer image processing system will be consumed by the composite rendering system at some point of time in the future. Hence, the need for the temporal compensation.

As part of this process, the scene management system will perform culling. However, this culling will occur against the temporally compensated state of the screen, which can be a set of possible future states. In one instance of this, a camera may be moving along a path with its' future motion constrained to a set of possible locations. The scene management system will cull against this range of future positions, rather than a specific location. In this manner, two important numbers are calculated. The first number is the probability that at least some of the layers will be consumed by the composite rendering program, and the second is a weighting of how important the sampling density should be, or how much fidelity a layer should have.

These two numbers can be wildly different. For example, an object far away in the distance the system may calculate the first number near 100% probability of it being visible and thereby needing to have its layers updated or computed. But, because it is far away, it is given a low priority on the number of layer samples it needs. Likewise, an object which is just barely off screen and is directly in the path of the predicted camera could be given a probability of being visible at only 50%, but a high priority in the number of layer samples used, or layer fidelity.

These two numbers are used to generate a collection of objects to request for shading. The system prefers to shade things which have lower probability of being visible with a low amount of layer fidelity, both the conserve computation, but also to lower the amount of memory needed to store the system.

The scene management system then sends requests to the layer processing system, for all objects and their corresponding layer images which need updating, to the layer processing system, using aforementioned temporal compensation.

In addition to sending requests to the layer processing system, the scene management system also computes a different and distinct culling against the actual scene information, building a collection of all objects and their image layers which are needed to render into a view space image. It then sends this collection of objects to a composite rendering system which tell it how to consume image layers. However, the requests are occurring asynchronously so that the composite rendering system is actually using a previous iteration layer images. The composite rendering system understands which image layers to use via a UUID which is shared between the messages sent to layer processing system and composite rendering system.

In some configurations, the scene management system may run in a client/server mode. In this mode, there will exist some number of client scene management systems and server scene management systems. The client scene management systems will broadcast their state to the server scene management systems, which will replicate a scene database from these messages. The server scene management system will not send these requests to the composite rendering system, except in cases where it wishes to use the services of a composite rendering system to determine culling information. Instead, it will send only the requests for layer image processing to a server version of the layer processing system, which will then synchronize with the client layer processing system, thereby offloading computation from the client device.

Layer Processing System

Figure 7:
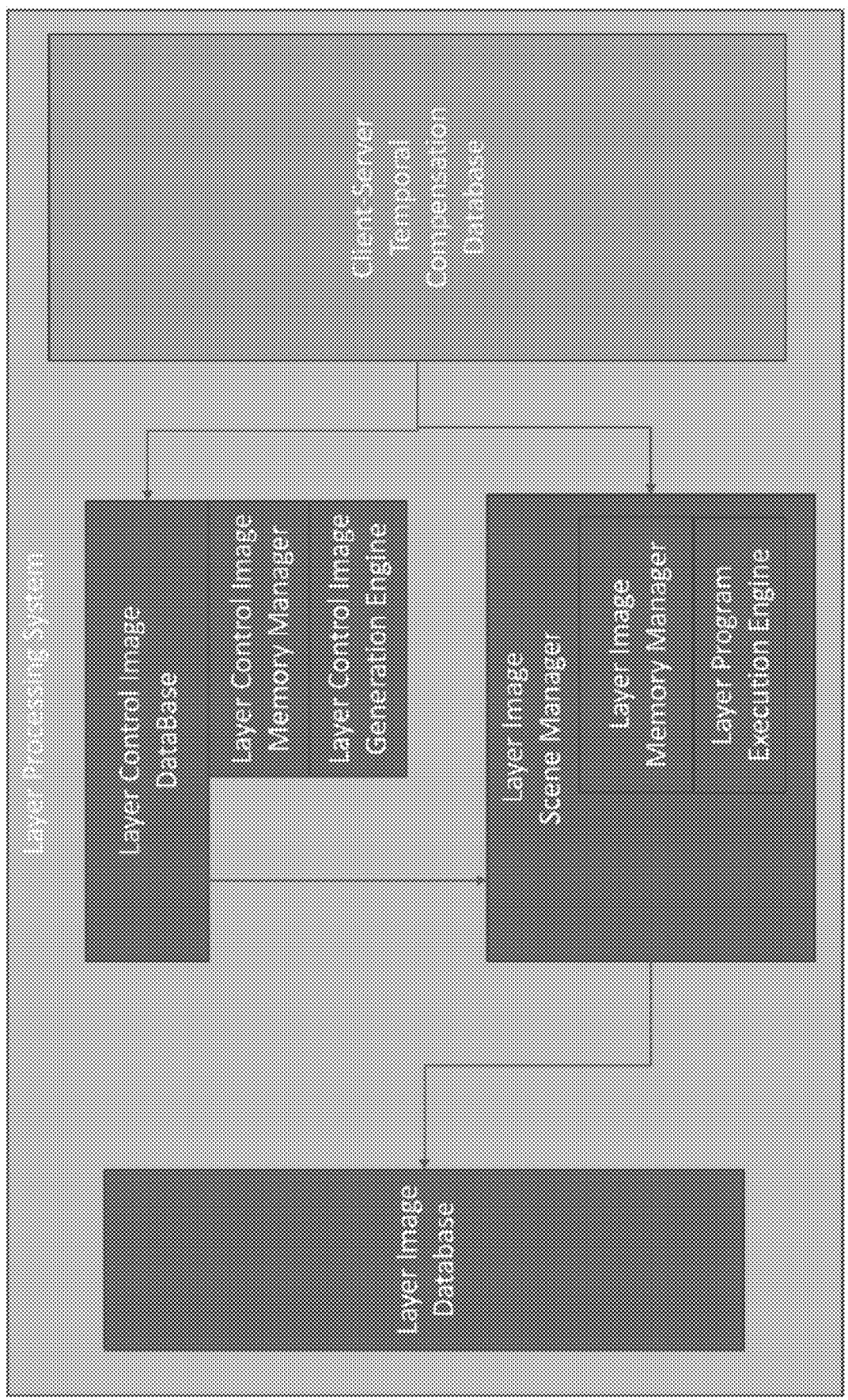
FIG. 7 shows a layer processing system, according to aspects of the present disclosure.

Referring now to FIG. 7, the layer processing system receives messages from the scene management system. These messages consist of data which designates which section of the image layers, which correspond to surfaces of an object, and meta data provided by the gameplay system which can be used to filter or updates different layers at different frequencies. Each message contains a UUID code which identifies the layer request for eventual consumption by the composite rendering program.

Also included in the message is the amount of fidelity the scene management system believes is needed for the surface and thereby the various layers.

Some state which is generated is too large to bind and manage through constant data binding systems, and instead uploaded directly into a resource which is consumed via a resource binding. This is done for animation data that represents a pose of a 3D object. In this case, the pose data consists of a large number of indexable matrices which are referenced by image layers and also the composite rendering program. In a case where the layer program processor is running on a remote server, this animation state is broadcast as its' own, independent message.

Each object to be rendered contains its surfaces, and each surface must store the layer images in memory which can eventually be consumed by either one of the layer programs, and some of the layer images will be consumed by the composite rendering program.

Because some sections of the layer images will not be sampled, it would be wasteful to allocate and compute them. Because of this, the layer program system uses a layer control image to both prune work that is not needed, and to avoid allocating memory that will not be used. This is done in two ways. In one method, the layer control image is transferred from whatever memory and device it was generated into memory visible by the layer program system. For example, the layer control image maybe be generated in some form on a GPU, but need to be considered by a CPU. The now accessible layer control image is used to determine what sections of layer images, if any, were consumed by the last frame. The layer program system then uses this information to consider how much, if any, requests it will generate to execute and store the layer programs and their respective image layers.

The second use of the layer control image is to use a mask to prune off sections of computation that are allocated into memory, do not need to be processed. Because it is difficult to know precisely which layer image samples might become visible in the near future, the control image layer is not used directly, but rather it is extended such that sections of the layer control image which are marked as unused but are near enough to sections that are marked as used will be marked for processing. Any individual layer program may elect to not have work pruned off in this manner. This step vastly increases the efficiency of the layer programs at some expense of memory—though the memory will never be either read or written to.

In the next step, the layer processing system sorts and allocates the layer images into memory appropriate for the layer programs to read and write. In one manifestation of this, the memory exists on a GPU computing device, but could be split across multiple computing devices. The total amount of memory used may be constrained, or unconstrained. In the unconstrained mode, the system will process all the requests, regardless of the total size. In this mode of operation, the system will grow and shrink the total amount of processing and memory based on the total amount of memory needed to execute all the layer programs In the second mode of operation, the layer execution system resizes the layer process requests to fit into a fixed size of memory. In this mode, the total amount of memory used for the system is fixed, and the system will make repeated refinement attempts to reduces the memory into the footprint. The system will prioritize things which are known to be visible over things which are only predicted to be visible. If the system sets the memory footprint to N Gigabytes of memory, the layer processing system will reduce, using a set of fairness metrics to achieved the aforementioned priorities, the layer images such that the total number of layer image samples fits can be stored in N Gigabytes.

Once the allocation step has been performed, the layer execution system has a list of layer programs and their associated destination and source layer images which need to be executed. This list is further sorted to minimize the total number of state changes such as resource bindings and program changes, to maximize the increase in hardware efficiency.

The layer processing system also maintains past history of the layers and maintains the layer image database. In this database, the results of the layers can be found by using the UUID provided in the message to process the layer. The database lookup is based on the UUID specified in the message from the scene management system, such that one objects surface can be stored and retrieved across time.

The inputs for each layer program are specified by metadata in the surface definition language, with the layer binding system, described later, performing the binding. The inputs are typically a set of parameter image maps (such as position, displacement, tangent, etc.), the intermediate results are known as intermediate object image layers, and the object image layers which are used for rendering an image are final object image layers.

The layer processing system builds a collection of layer programs to execute, and then broadcasts or submits them to a computing device for execution. In one manifestation, this is a GPU, but could include a multitude of computing devices. The layer processing system contains dependencies between all the layers, and issues the layer programs for execution in an order optimal for the particular computing device being used, and dispatch the layer programs for execution on different computing systems and issue the appropriate copies and synchronizations between the devices. The completion of this process results in a collection of layer images which are managed by the layer processing system, and possibly stored for future reference.

Figure 9:
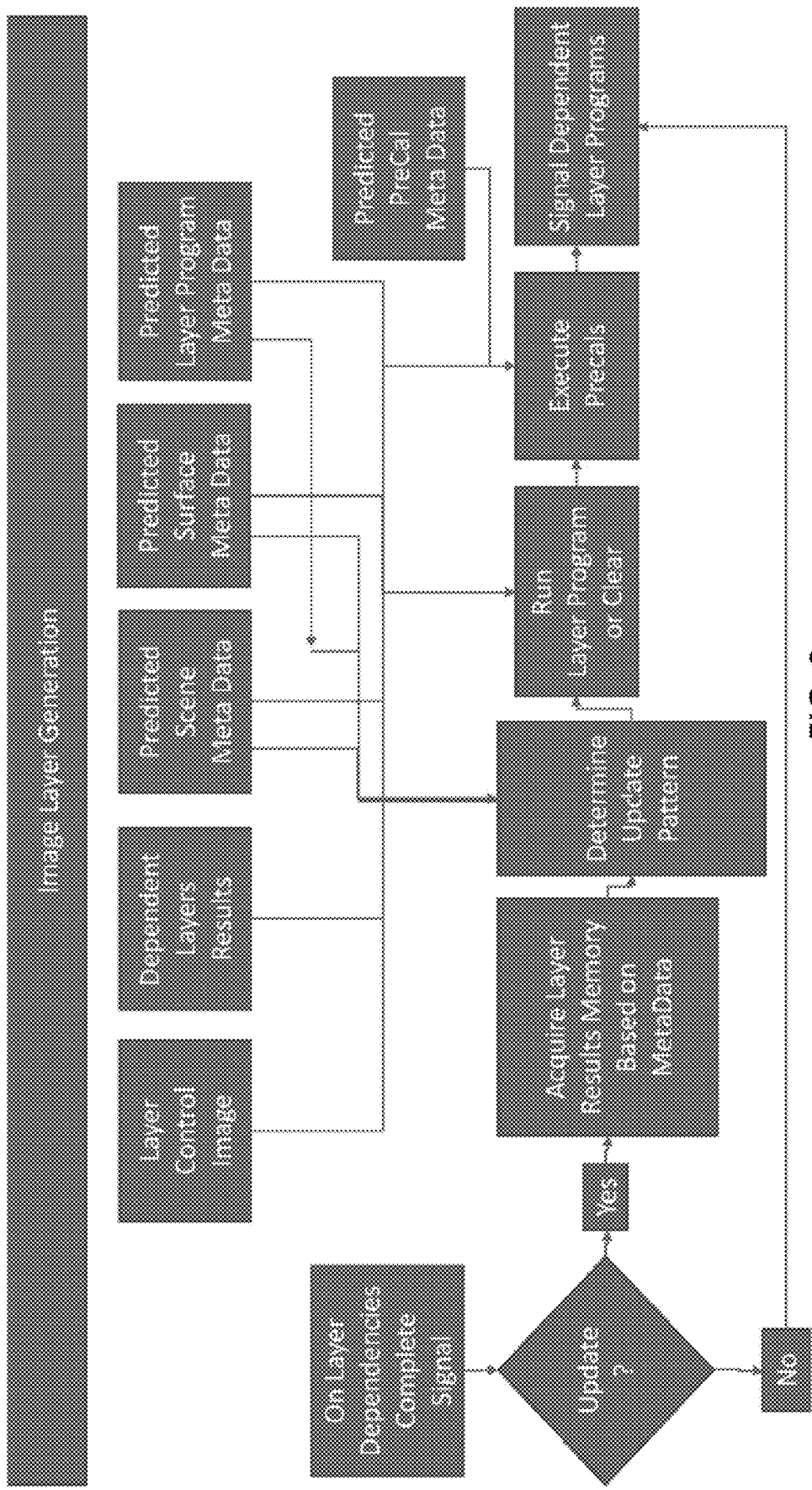
FIG. 9 shows a process for updating a layer image, according to aspects of the present disclosure.

During the execution on the computing device, the layer programs will store their results into the layer images. In one manifestation, the layer images are renderable 2D textures which are exceptionally efficient to use on GPUs. However, the layer images could be higher dimension so long as the appropriate coordinate mapping is provided. The coordinate may be non-spatial, for example, a third coordinate might represent the surface changing over a time period. Or, an object image layer may be a voxel representation (FIG. 9).

All intermediate and final layer images can be multi-dimensional, and each layer image may store it's results in a different precision and format from other layers. For example, a color value may be stored in only 8 bits per channel, where a 3D normal might be stored in a 32-bit float. The sample rate and size of the layer images samples in a layer image may further be different, specified by the surface definition. The surface definition, may, for example indicate that one of the layer images should be twice the sample rate of the final image layer, and would then be processed at twice the number of samples. This could be used for super sampling sub sections of the rendering process to achieve results comparable to variable rate shading on other architectures.

The layer programs are executed in sequence such that the layer program for an object and surface is always executed in their entirety before all subsequent layer programs for an instance of a surface are executed. Because of this, each layer program has direct access to the entire intermediate results of the previous layer, not just to the samples which correspond to the layer image samples which it generates. This allows operations which are impossible in most material and shading systems to be easily performed. For example, instead of a normal map being stored with an object, it is now straightforward to calculate a normal dynamically by creating an intermediate G buffer and performing straightforward filtering operations on it. Although G-Buffers have been used in deferred renders to dynamically create normals, they are often unusable and unstable because the local neighborhood information needed for a stable filter cannot be present, and the g-buffer is highly susceptible to variations from frame to frame, causing a shimmering effect. Because these layers are in object space, these problems do not exist. Other information can also be calculated easily, such as curvature maps, local AO, and so forth.

Because some layer programs may need wide access to neighboring layer image samples, the layer processing system will over process adjacent layer image samples. In this process, for a given layer program the layer processing system will over process layer image samples that do not map directly to any actual sample point on the 3D model, but which are convenient for local discovery to adjacent layer image samples. One manifestation of a layer program, a Gaussian blur is generated via sampling a neighborhood of image layer samples, weighting them against the physical distance determined by another layer image which stores position.

There may also exist surface properties which could be unique for different views, but be computed simultaneously for improved efficiency. In one manifestation of this, a layer program can compute simultaneously the shading values for both eyes in a VR shading system. Because only the view direction and camera position are changed, much of the work can be duplicated for a massive increase in efficiency.

Because the object image layers can persist across frames and can store arbitrary intermediate data, it is possible to have the previous frames rendering data accessible for other rendering operations which may or may not be integrated into the surface parameter evaluation step.

It is also not necessary to re-compute the entire object image layer. For interactive rendering, it is more important that a shading framerate be high enough to be seen as continuous, then the object surface properties be exactly precise to the current frame.

Thus, the shading can occur progressively where only some of the data elements in a surface property are updated each frame. In an object image layer, this might mean that every other pixel in the object image layer is updated each frame, further, the surface rendering program could use more than the current frame (e.g. previous frames) data to interpolate between the frames, thereby smoothing out any surface parameter transitions that might occur via Level of Detail (LOD) changes in the object being rendered.

Moreover, because the surface properties and final object image layers may not be instantaneous, e.g. a final surface property evaluation program may use previous frame's data its reconstruction, it may be necessary to predictively evaluate the surface properties, sometimes for surfaces which are not considered visible.

For example, if one of the final object image layers is designated as storing the Lambertian lighting term, light probes can be sent into the scene and indirect lighting computed at various places in the scene. This is possible because the Lambertian terms for the scene are already stored thus all that is left to do is find them in the data storage chosen. This could be done by tracing rays into the scene, finding the intersection points, and then using the same lookup function the surface rendering program would have used.

If this data is being used for more complex rendering operations that are important to the final image rendering, it may be the case that some object's final image layers which are not visible or used directly to rendering the final image are used in any process which needs the scene access. For this purpose, any visibility optimization which occurs during the visibility step needs to be modified so that any data needed will be available for the appropriate rendering step.

Additionally, some object image layer shaders could be enabled by having the scene data available. An example of this is a reflection map where the scene is traced and the color for that reflection ray is stored into a layer, eventually being incorporated into the final object image layer and thereby final rendered image.

An example of this would be a VR simulation with rapid head motion. The head may move so quickly that the surface property evaluation program does not all the data it needs to render into the final images. By predicting the direction and speed of the camera motion, the data which is needed can be primed and ready.

Because an Image layer program has access to all layer images of a previous frame of the surface of the 3D object being rendered, in one manifestation of a layer program can extrapolate information and samples for previous layers thereby increasing quality. This technique is analogous temporal anti-aliasing which uses corresponding samples of previous frames to construct a super sampled, higher quality sample point by using the previous N frames of data, where N is usually between two and five frames. In manifestations of temporal anti-aliasing in deferred and forward renderers, there exists significant complexity in determining the relevant previous and relevant sample point on the screen in the frame data, since objects and camera are constantly moving, becoming visible and invisible. This has the effect of an image quality often looking sharp when the scene has no motion, but becoming noisy, blurry or otherwise inaccurate as objects move even slightly.

This process, by contrast, allows previous samples to be found precisely. The system provides the exact information, typically in the form of an image texture coordinate transform, for each layer to precisely find any stored sample that has been previously computed. Thus, for any layer image sample written or consumed by any layer program, this system has exact information of not only it's previous image layer sample value, but also the previous image layer samples of any adjacent samples. Any layer program may perform this process, irrespective of the types of data which it might generate.

This allows superior temporal upsampling filters, and moves temporal anti-aliasing techniques for Image View Space to Object Space. A layer program can access a complete history of its' local sample and all previous layers, and then composite and weight these samples together to generate a high quality shaded output. One manifestation of this is the construction of a shadow filter which considers a combination or all previous samples of all shadow map values to produce a high quality result, where each individual frame only processes a handful of new samples.

In addition to simple layer programs which consume data provided in the data binding step, a layer program may be fully asynchronous, and because previous layers can be accessed, may generate data not to be used by the current set of layer programs, but for subsequent execution of a layer program and its' associated object. In this manner, an image layer can also be used to dispatch computation work which could occur on a GPU or other computing device, with the results of said computation being placed in an intermediate object image layer and done asynchronous with the rest of the system In one manifestation, an asynchronous ray tracing step is dispatched to compute shadows. For this process, an object image layer first generates an intermediate image layer for a given light direction. This layer would be a type of g buffer with light direction property attached. The layer would be consumed as input into a ray tracing step, which would generate a layer which could be consumed by another object image layer and eventually into the final object image layer. Ray tracing may fully be asynchronous such that it takes several hundred milliseconds before the layer image to be generated. Because of this, this layer may use a predicted position of the ray traced samples as provide by the scene management system.

During this process, several frames worth of previous shading samples may be stored in the layer images, and all of these layers may be considered by another layer program in a large filter which integrates across both time and space. Unlike a screen space version of this, the samples are precise and unchanging along the surface of the object, providing additional stability. This system supports all types of filters, including machine learning denoising filters.

Image layer programs can use a variety of techniques to perform the calculations of their corresponding surface properties. In one case, a layer program is a machine learned filter implemented as a layer program. To generate this machine learned layer program, the machine learning process must be initiated on a large quantity of data. To facilitate this, the image layer processor operates in a mode where the layer images are substantially oversampled and over processed to achieve the highest possible quality. For example, a highly precise radiosity solver might run during a first layer program, where a second layer program might create a noisy, approximated radiosity solution. The data of the first and second layer programs is then used to generate a third layer program which attempts to process the noisy solution such that it has a similar quality to the high quality layer program.

In this configuration, a layer is marked as a learnable input layer image, and is not actually used for rendering. The system runs in a lengthy process by which the layer images are instead output to learning system to allow the training of a high quality layer program based on the learned data.

Layer System Resource and Data Binding System

Specified in the language for the surface definition program, the resources and constants which are used by the program layers and the provided via semantic naming. The layer resource binding system consists of two distinct parts, the binding and resource aggregation system, a data repository system which stores any globally needed values as well as any data in the temporal compensation database which is needed for a layer program to execute.

Data bindings for both constant and resources in the surface definition language are provided by a series of attributes, amongst them are a name, a subname, and index. These attributes are further aggregated with an implicit layer image frame index which corresponds to a number which moves backwards in time, since the image system may have several versions of a layer from previous frames. Taken together, the system builds a hash from these data items and indexes into the data repository for the specific resource or value that is needed.

For example, a material may request the view matrix for a particular shadow projection texture. Because multiple frames can exist of a shadow, there could exist multiple versions of this projection as it is changing throughout time. Thus, the system choses the correct version of this view matrix by combining the aforementioned temporal frame index into the hash calculation and indexing the value into the repository. In this manner, data bindings will index to the correct version of the data needed, which is critical in cases where the system may need either predicted or past version of a piece of data for correct rendering, and each layer may need a different version of that resource or binding.

The binding system will automatically composite and build sets of constant data and place them into the appropriate memory for the execution of the layer programs, as well as manage data bindings.

Transmission of Layer Images (Encode And Decode Modules)

Figure 2:
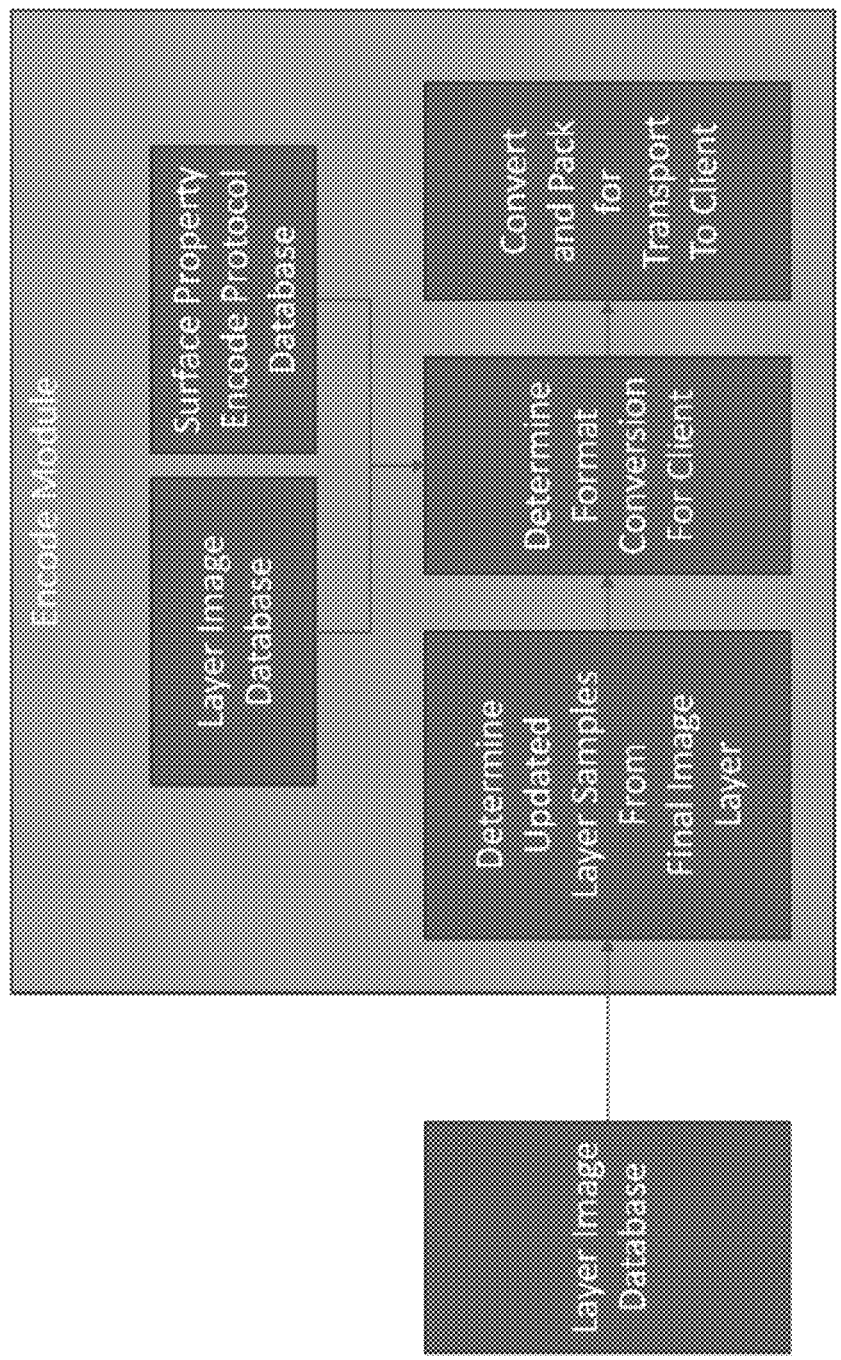
FIG. 2 shows an encoding process for the broadcast of layer images from a server to a client, according to aspects of the present disclosure.
Figure 3:
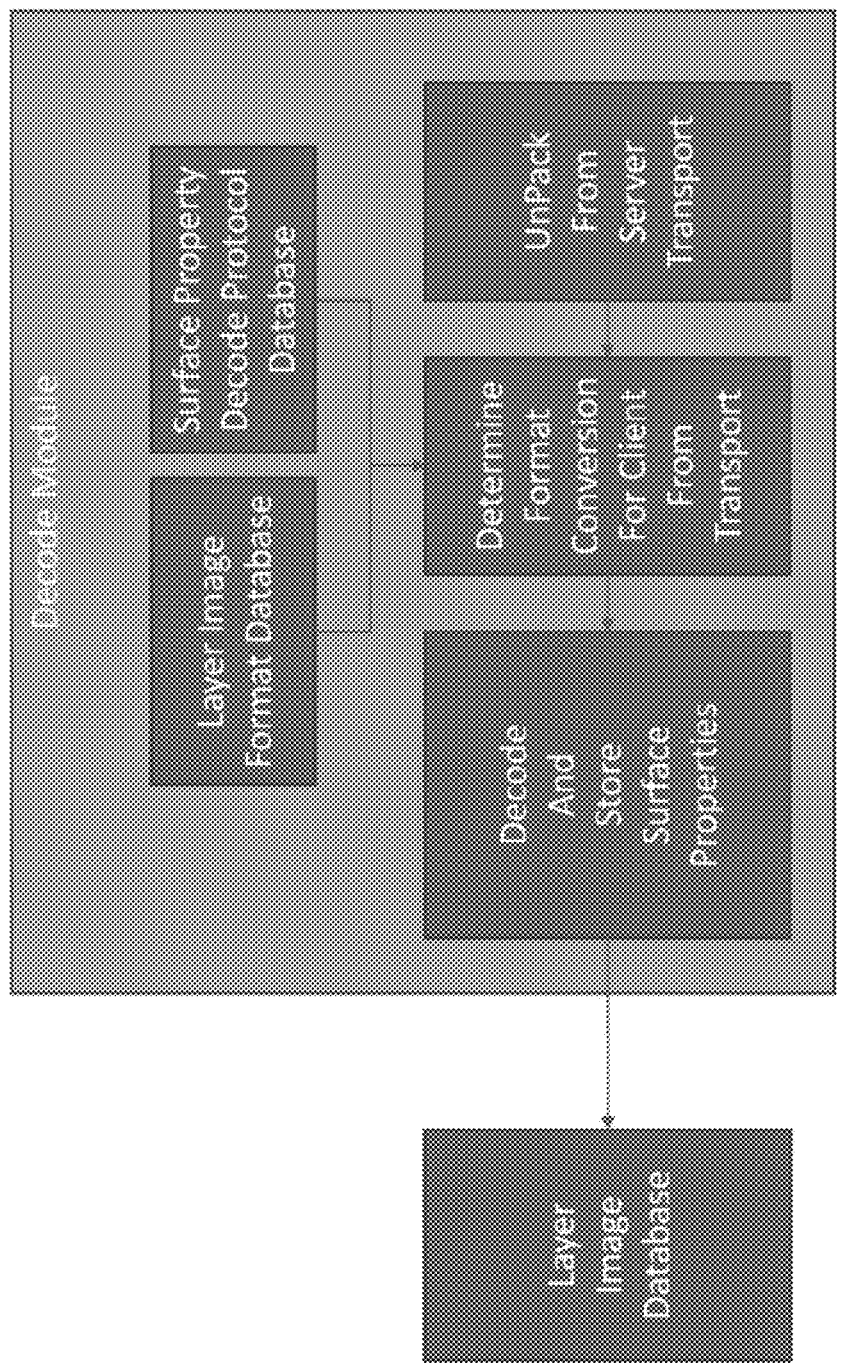
FIG. 3 shows a decoding process for the receiving of broadcasts of a layer image to a client from a server, according to aspects of the present disclosure.

Referring now to FIG. 2 and FIG. 3, in some configurations, there may exist both a server and client version of both the layer processing system and the scene management system. In this configuration, the client version of the layer processing system perform a subset or no computation of the actual layer programs, and instead uses layer images received to it from server versions of the layer processing system. The scene management system may also duplicate the scene database on the server so as to not need to transmit some of the data which the server image processing system might need. In this process, the messages sent to a client scene management system are further sent to a server scene management system, which then sends requests to a server layer processing system which sends the layer images back to a client layer processing system.

In addition to the messages for image program processing being sent from client to server, the system all aggregates all known data bindings which have been read from the data repository, including data that is part of the temporal compensation database, and transmits this data to the server. For example, if there exists a camera view matrix in the system, the scene management system should have stored a future version this value based on its understanding the time lag needed for the future state. If there exists skinning or bone information, this information is also broadcast, which is temporally compensated by the scene management system.

In this manner, all necessary data to execute the layer programs has been transmitted to the server, with the values being predicted as appropriate.

The server layer image processing system may not correspond one to one with a client version of it. In some configurations, multiple clients may attach to the same server layer image processing system. This would be useful in cases where several players in a multiplayer game exist in the same scene, which would allow a layer system to aggregate duplicate requests and reuse processed information.

In this configuration, the server layer management system works exactly as described in aforementioned disclosure, but adds additional steps. The layer management system creates a context for each client that consists of a full or partial copy of the image layers, and any meta data which is needed to interpret them.

The server version of the layer processing system now performs additional steps. After processing any individual layer image, it sends the layer to an Encode Module.

The Encode Module compares the results of the layer image to its' copy of the layer image of a client, and creates a delta image between the client's layer image and the one computed on the server. If the client has no information in the layer, then it will presume the clients' version of the image layer is values of uninitialized.

This delta image represents the changes between the image layer frame on the server and what exists on the client.

This delta image is a minimum and sparse representation, since most sections of the image layer are unchanged from the previous frame. Changes which are zero changes are immediately discarded, since no update need be sent. If a section of the image layer has changed, the system further compares the image to any previous versions of the frame, creating additional delta images.

The Encode module then then creates a sequence of data packets using standard image compression techniques which includes lossy and lossless compression techniques. Additionally, the system can compare the images for previous versions of the layer images to see if a previous layer has less data changes then the current layer. In this mode, it can broadcast the data packets as changes from any of the previously stored layer images, rather than the last image layer.

Layer Images can contain meta data allowing the exact algorithm for compressing that layer to be customized or capped. For example, if a layer is known to only contain normal information, the compressor may then translate the normal into an angular representation. Likewise, if it's a color data it can break the data into separate luminance and chroma values, transmitting the results at different frequency.

A layer image can limit the total bandwidth and quality of its' updates to reduce overall bandwidth. It may be determined, for example, that a layer does not contain information which requires precise data over time. This might be true for a low frequency ambient occlusion pass.

After the Encode module computes all of the aforementioned packets, it then may optionally perform entropy encoding on the packets and broadcast them to a decode module of a client version of the layer processing system for decompression. The decode module will decode the packets, and apply the changes into the image layer database. The encode module will replicate the decoding, such that it will maintain an exact version of the client's image layer database. In this manner, error which is introduced during the compression will not aggregate over time since the encode module will encode the difference between the client's actual version of the image.

In this mode of operation, the client layer processing may perform some or no execution of the layer programs themselves. Some layer programs may be marked in the meta data to execute locally, in which case they will run on the client. This is useful in cases where the latency and temporal compensation are not sufficient. As an example, it would be appropriate for an object which has precise mirrored reflection to compute these layer images locally, since any latency introduced by having the layer image processing remotely would be unsatisfactory.

However, in one configuration the client might not do any execution of the layer programs at all, and in this configuration may not even contain any of the resources for the layer programs to execute on at all, though the client would still need any data required for the composite rendering program such as vertex buffers, index buffers etc.

In this configuration, the client need not ever have stored either in physical memory or on a disk the input data. In a large, open world game this could represents hundreds of gigabytes of data that need not exist on the client, and can exist only on the server. Because this data is expensive and client memory is expensive, this can save considerable cost.

Composite Rendering System

The surface property description language defines a composite rendering program which consumes the layer images and other resources of the 3D object image layers and creates the actual manifestation of an object into a view space image. The composite rendering program can combine multiple object image layers in arbitrary combinations to compute the final image, or do little more than using one of the layer images to find the surface color and outputting that to the final image.

Figure 10:
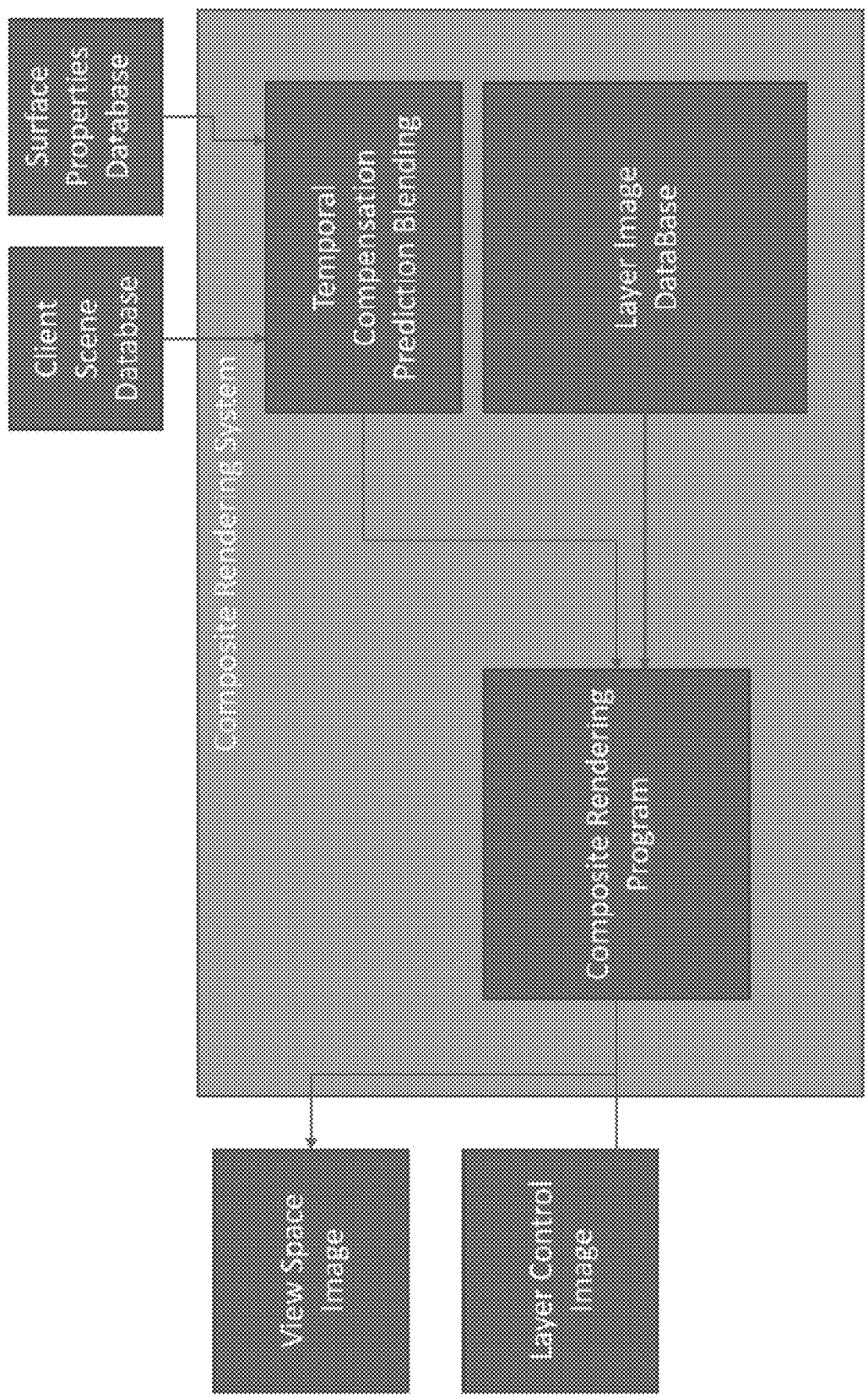
FIG. 10 shows a process for compositing an object into a view space image, according to aspects of the present disclosure.

The composite rendering system (FIG. 10) receives requests from the scene management systems, and creates a View Space Image via executing the corresponding composite rendering program. The composite rendering system uses the UUID given to it by the scene management system to bind the layer images consumed by the composite rendering program to the data generated by the layer processing system.

The composite rendering system performs its' operation by sending to a computing device, such as a GPU, a sequence of commands which will execute a collection of composite rendering programs into a view space image. If the composite rendering system is sending its' commands to a GPU, it may utilize pixel shaders, geometry shaders, tessellation shaders, vertex shaders and hull shaders, or ray hit shaders to perform the operations required to generate a view space image.

During their execution, each composite rendering program may also execute a variety of tasks unique to this overall architecture.

Since each composite rendering program has access to previous frames layer image as stored in the layer image database, it blends image layers from previous frames to amortize or smooth out surface property evaluation changes which occur frame to frame, such as specular highlights changing based on view angle. This facilitates surface property evaluation at a rate lower than the rate of rendering the final image. In other words, the object image layers may be reused across multiple frames. This could allow the shading of a 3D object to run at ten frames per second or lower, but appear to be smooth since the shaded values could be stored in a layer image and interpolated.

The composite rendering program also may optionally mark which layer image samples where actually consumed during its' execution. In one manifestation of this process, the composite rendering program marks into a layer control image which samples where actually consumed. The layer control image mirrors the mapping of one or more image layers, that is, each sample in a layer control will directly correspond to one or a regular group of samples in a layer image. In the simplest form, a layer control image will be a reduced sampling rate of a layer image. For example, a layer control image may have only a quarter of the layer image samples as the image layer it marks. Additionally, multiple image layers may map to the same image control layer since the composite rendering program often the image layer samples often have identical mapping functions.

One manifestation of this is using texture footprint hardware available on GPUs, if the layer image samples are read via texture sampling hardware. Texture footprints are used to generate a layer control image. In this process, a hardware sampler calculates and marks specific texels in a texture which map to texels which are read, instead of performing a texture filter operation. This hardware process can guarantee that every layer image sample which will be touched by the composite render program is marked by the corresponding layer control image sample.

The composite rendering system may optionally run the entire scene in two passes. In the first pass, called a z prepass, only the z value of the Z Buffer is written to in the View Image, in the second pass, the actual object is generated and the layer control image is updated. In this manner, 3D objects and image layers which are not visible on the screen will be indicated in the layer control image so that that the layer program system need not process them. The layer control image is initialized to unused before the execution of the composite rendering programs. In a server/client configuration, there may exist a composite render system on the server which only performs the first pass to optimize execution of the layer programs. Further, the server may have an instance of composite rendering system for each client to compute the visibility for each client independently.

In a further mode, the composite rendering system can also execute the z buffer update z prepass such that the system has an understanding of what might be visible in the near future by using the temporal compensation database. In this mode, multiple sets of layer control images are generated by running multiple z prepasses. For example, the temporal compensation database may indicate three possible future views of the camera, and therefore the composite rendering system will execute three z-prepasses rather than one. During each z-prepass, a unique layer control image will be generated. A final image layer control is generated from this collection of layer control images by unioning them together. It is this final layer control image which is sent to the layer processing system.

During the execution of the composite rendering system, various time information is stored such as the total round trip from server to client, time between layer program execution and composite render program execution, and the total time between the beginning of the composite rendering system execution and when the view space image becomes visible on the screen. These timings are sent to both the scene management system and the layer processing system so they may consider the timings for the construction of the temporal compensation database.

In addition to the surface property evaluation, which may include shading, occurring on different computers or GPUs, all objects in a scene have no dependency on one another for their individual evaluation.

Thus, the surface property evaluation can occur on an arbitrary number and distribution of computers, such as a large server system, provided that any process which requires the entire scene data would need to synchronize the sections of the object image layers needed for this step.

Object Image Layer Synchronization

Because the evaluation of an objects surface could occur on an entirely different computing device from the device which is rendering the final image, the final object image layers must be synchronized between the devices. The final image layer repository can be synchronized across systems via a UUID for each discrete memory location, and that sub-sections can be updated via defined viewports.

In one configuration, a system can have multiple GPUs where one GPU evaluates the final object image layers while another GPU which is connected to a display consumes these final object image layers to perform the rendering of the scene. In this configuration, the final object image layers are transmitted from one GPU to the next.

In another configuration, one system can transmit the final object image layers across a network or wireless system such that more powerful computing devices is performing the complex object image layer evaluation, where the other is performing the final image rendering. This is particularly useful for VR (virtual reality) applications, where the headset needs to be light weight and more power efficient.

Because the surface properties that are stored in the object image layers typically represent final shaded data, they often do not change quickly from frame to frame. Thus, during the synchronization of the object image layers, as an optimization, the system can send an update to the sections of the object image rather than the entire object image layer.

Further, because the final object image layers are typically stored as 2D color images, a wide variety of video compression techniques can be used to compress the image layers. Video compression and decompression hardware can also be repurposed to compress the final object image layers.

Compute Shaders and Non-Graphics Pipeline Computation of Object Image Layers

The object image layers need not be implemented via the traditional graphics pipeline, such as pixel or fragment shaders. Rather, they can be implemented entirely via a compute shader. This has a few distinct advantages. The first advantage is that allows shading to execute on a simpler hardware front end, and on some hardware, natively asynchronous to the graphics pipeline. Shading which uses only compute can execute on a compute-only queue in APIS such as Vulkan and D3D12. A compute only queue might not be a GPU at all, but could conceivably be any computing device.

A second advantage of executing a layer shader via a compute shader is that by doing so, it allows the image layer shader to access neighbor information without having to explicitly store the results into another layer, via the local shared memory property. This allows for increased efficiency since the intermediate values need not be stored in an intermediate object image layer.

Caching of Intermediates Object Image Layers

Each object image layer, being intermediate or final, can either be transient, meaning it does not persist across a frame, or can be cached, meaning the intermediate object image layer will persist for an object until such time as it is evicted because the object has not been rendered for some number of frames, or has been designated via some event as needing to be updated.

In many cases, an intermediate image layer need not be ever updated. For example, a material layer of metallic chrome might have been defined to trigger on an intermediate layer mask that was a complex masking of noise, curvature, and other static masking of an object. But since the mask is entirely invariant from frame to frame, there is no need to regenerate the intermediate.

Final object image layers may also be cached for similar reasons. For example, a surface property program might divide an object into Lambertian terms, which are not view-dependent, and specular terms, which are. The Lambertian portion is known to not be changing, or changing very slowly and thus does not need to be updated at the same rate as the specular term. This can be designated by the surface property description language.

Layer Visibility

It is possible that some sections of the object image layer are not visible or will not contribute to the final 3D rendered image. As an optimization, these sections of the image layer can be excluded from computation. The visibility detection would occur either as a CPU step, or could occur during a previous rendering step where the subsections of the final image layers which are needed for rendering are stored and aggregated for the next evaluation of the object image layers.

Some sections of a layer may not be visible simply because they are facing away from the camera of the scene. In this case, it is not necessary for feedback from the rendering step since this can be determined by evaluating the direction of the normal of the surface parameter, which will clearly indicate if those properties are backfacing.

In some implementations, a method for rendering parameterized 3D objects into a frame image is as follows. A surface definition program is created and compiled into a collection of meta data, layer programs and composite program. Parametrized 3D Objects are created with the data that is needed to execute the layer, during either the loading of the 3D asset, or through some type of data processing step. Layer execution will occur on a server, and the composite program will be run on a client. The server and client may be different machines, such that layer input data may not be present on the client. During rendering, the host system determines which objects may be visible or are likely to be visible on the screen, predicting visibility on the path of any camera which might alter the view frustum. The system then predicts the position and state of the object will be in at the time the composite program will consume the layers. The system assigns a shading weight based on its prediction of the objects possibility of visibility, with objects which may become visible shortly being shaded pre-emptively.

The parameterized 3D objects are submitted for processing using the predicted state and predicated shading rate. Resources are bound using the meta data binding information provided in the material definition language. The submission is message based and may be transmitted from a client computer, to the host computer for the execution of the layers. The latency between the transmission and processing of the request is timed. Any data which is needed for prediction of the state of the object is sent, such as the objects velocity or animation blend state. The server allocates and manages the layer programs, taking care to track and cache the layer data across frames, this process is asynchronous to the client's execution of the layer composite program. Previous frames computation of the layers can be stored and accessed arbitrarily, the total amount of aforementioned layers which can be stored is dependent on the available memory of the device. The previous frames layers will be made available by both the execution of the layer program and the composite rendering program. The server executes the layer programs at the frequency specified by the meta data provided in the layers, taking care not to update information that is not invalid (such as an intermediate normal map).

Layer programs may be executed in the entirety before the next layer program in a surface definition are executed. This allows adjacent data to be available. A layer program may execute against a server managed scene via a more complex operation such as a ray tracing step—storing the values asynchronously. The server maintains a copy of the client's version of the layer data and compares it to the computation of the layers. The server only tracks layer data which will be consumed by the layer composite program. On the server, the deltas between the client (of which there may be multiple) and the server's layer data are collected. On the server, the deltas are compressed via a lossy format which utilizes the temporal locality of the samples. The deltas are transmitted, if required, from the host to the client as a series of data packets. The client reconstructs the layer data from the packets received by the servers and updates it's copy of the layer. The layer composite program renders the object into the client's image based on the maintained version of the layers. The entire time between transmitted the shade request and execute of the layer composite program is timed, and this time is transmitted to the server such that it can accurately predict the state of the object.

While the present disclosure has been described with reference to one or more particular embodiments or implementations, those skilled in the art will recognize that many changes may be made thereto without departing from the spirit and scope of the present disclosure. Each of these embodiments or implementations and obvious variations thereof is contemplated as falling within the spirit and scope of the present disclosure. It is also contemplated that additional embodiments implementations according to aspects of the present disclosure may combine any number of features from any of the embodiments described herein.

What is claimed is:

1. A computer-implemented method of rendering three-dimensional (3D) objects in an object space to two-dimensional (2D) view space images in a view space, the object space being distinct from the view space, the method comprising:
generating local surface properties for each 3D object from one or more parameter image maps;
generating, based on the local surface properties, one or more intermediate object layers in the object space;
rendering one or more 2D view space images by consuming and projecting the intermediate object layers;
rendering, for a first scene, a first set of 2D view space images by projecting each of a first group of one or more intermediate object layers;
storing, as a second group, intermediate object layers selected from the first group; and
reusing the group of intermediate object layers by rendering, for a second scene, a second set of 2D view space images by projecting one or more intermediate object layers of the second group.

2. The method of claim 1, wherein:
generating the intermediate object layers comprises shading one or more sample images; and
shading the sample images occurs before prior to projecting the intermediate object layers.

3. The method of claim 2, wherein one or more intermediate object layers comprise local surface properties for a sampling rate.

4. The method of claim 1, wherein members of the second group are selected by a scene manager.

5. The method of claim 4, wherein members of the second group are selected by a scene manager.

6. The method of claim 1, wherein a first 2D view space image is rendered using multiple members of the second group.

7. The method of claim 1, wherein one or more intermediate object layers comprise local surface properties for a sampling rate.

* * * * *

UNITED STATES PATENT AND TRADEMARK OFFICE
CERTIFICATE OF CORRECTION

| | | |
|---|---|---|
| PATENT NO. | : 12,169,893 B2 | Page 1 of 1 |
| APPLICATION NO. | : 18/140354 | |
| DATED | : December 17, 2024 | |
| INVENTOR(S) | : Timothy James Kipp and Daniel Kurt Baker | |

It is certified that error appears in the above-identified patent and that said Letters Patent is hereby corrected as shown below:

In the Claims

Column 28, Lines 56-60, Claims 5 and 6 please reorder the claims as follows:
"5. The method of claim 4, wherein members of the second group are selected by a scene manager.
6. The method of claim 1, wherein a first 2D view space image is rendered using multiple members of the second group."

With:
--5. The method of claim 1, wherein a first 2D view space image is rendered using multiple members of the second group.
6. The method of claim 5, wherein members of the second group are selected by a scene manager.--

Signed and Sealed this
Sixteenth Day of December, 2025

John A. Squires
*Director of the United States Patent and Trademark Office*